United States Patent Office 3,062,900
Patented Nov. 6, 1962

3,062,900
STABILIZATION OF POLYMERIZABLE HALOGEN-CONTAINING MONOMERS WITH p-METHOXY PHENOL
Harry W. Coover, Jr., and Donald J. Shields, Kingsport, Tenn., assignors to Eastman Kodak Company, Rochester, N.Y., a corporation of New Jersey
No Drawing. Filed Aug. 11, 1960, Ser. No. 48,802
5 Claims. (Cl. 260—652.5)

This invention relates to stabilizing halogen-containing monomers such as vinyl and vinylidene halides, and more particularly vinyl chloride and vinylidene chloride and mixtures thereof with other non-halogenated, polymerizable vinylidene monomers, in such manner that the stabilized monomers, although stable under storage conditions for an indefinite period of time, can be used directly without further purification, i.e. without removal of the stabilizing agent in ordinary polymerization reactions.

It is known that halogen-containing monomers tend to undergo chemical change on exposure to the action of air and light. This is especially true in the case of vinyl and vinylidene chlorides which gradually polymerize to resinous products on standing. Accordingly, various inhibitors have been proposed heretofore to prevent premature polymerization of these compounds during transport and storage. For example, as is well known in the art, vinylidene chloride as furnished commercially contains as inhibitors between 0.5 and 1.0% (equivalent to 5,000–10,000 p.p.m.) of phenol. This concentration must be used in order to effectively stabilize the monomer. However, the phenol interferes seriously with vinylidene chloride polymerizations and, accordingly, it must be removed from the monomer before such use. In large-scale operations, the removal and disposal of the toxic phenol is an expensive and troublesome operation, and appreciable monomer is also lost in the operation. In some instances, the freshly distilled monomer must be re-stabilized with hydroquinone, for example, so that it can be safely and effectively handled in subsequent processing operations.

We have now found that p-methoxy phenol is soluble in and is unusually effective polymerization inhibitor for vinyl chloride and vinylidene chloride monomers and mixtures in any proportions of these monomers with each other, or with other monomers such as vinyl esters, alkyl acrylates and methacrylates, acrylonitrile, etc., being highly effective in concentrations as low as 30 p.p.m., based on the total weight of monomer and inhibitor. Moreover, much to our surprise, it was found that concentrations up to as high as 600 p.p.m. of p-methoxy phenol in the monomers can be used in certain polymerization processes, as in preparing copolymers of the above-mentioned monomers with acrylonitrile, without removal of the p-methoxy phenol therefrom, and that the polymerization rates and polymer properties are not adversely effected thereby. Thus, vinylidene chloride stabilized in the above manner can be used directly without any increase in the concentration of the polymerization catalyst or activator, the polymerization proceeding with no observable decrease in rate and the polymer formed thereby having substantially the same molecular weight and physical properties as the corresponding polymer formed from the unstabilized monomer. For example, in the persulfate/bisulfite-catalyzed emulsion copolymerization of vinylidene chloride and acrylonitrile, vinylidene chloride inhibited with 200 p.p.m. of p-methoxy phenol gives the same rate of polymerization and polymer yield and inherent viscosity as freshly-distilled inhibitor-free vinylidene chloride. In addition, the stabilized monomer proved to be completely stable in all preliminary handling in the process prior to actual polymerization.

It is, accordingly, an object of the invention to provide a process for inhibiting the polymerization of halogen-containing unsaturated monomers such as vinyl chloride and vinylidene chloride during transport, storage and handling. Another object is to provide compositions of these monomers containing p-methoxy phenol as stabilizer. Other objects will become apparent hereinafter.

In accordance with the invention, we mix the p-methoxy phenol by conventional mixing means with the halogen-containing monomer, in such proportions as to give a concentration of from 30–600 p.p.m., but preferably from 50–500 p.p.m., of the p-methoxy phenol in the monomer. Vinyl chloride and vinylidene chloride stabilized as above remain free from polymer for an indefinite period of time under ordinary atmospheric conditions. The effectiveness of p-methoxy phenol in comparison with the conventional phenol for stabilizing vinylidene chloride monomer is illustrated in the following table:

TABLE

| Inhibitor | Concentration | Observed Stability |
|---|---|---|
| Phenol | 0.05% (500 p.p.m.) | Poor. |
| Do | 0.80% (8,000 p.p.m.) | Excellent. |
| MEHQ [1] | 0.05% (500 p.p.m.) | Do. |
| MEHQ | 0.02% (200 p.p.m.) | Do. |
| MEHQ | 0.01% (100 p.p.m.) | Do. |
| MEHQ | 0.005% (50 p.p.m.) | Do. |

[1] MEHQ is p-methoxy phenol.

The above results show that the effectiveness of p-methoxy phenol as a stabilizer for vinylidene chloride monomer is of an entirely different order requiring only from about one-hundred sixtieth ($1/160$) to one sixteenth ($1/16$) as much as of the p-methoxy phenol as of the phenol to obtain the same stabilizing result. At these concentrations, phenol is altogether ineffective.

The following examples will serve to further illustrate the invention.

*Example 1*

This example is for comparison purposes and illustrates the copolymerization of uninhibited vinylidene chloride with acrylonitrile.

In a typical continuous polymerization process, uninhibited vinylidene chloride, acrylonitrile, a 0.33% aqueous solution of ammonium persulfate, and a solution of 2.8 parts by weight sodium metabisulfite and 8.35 parts by weight of sodium lauryl sulfate in 1000 parts by weight of water were added continuously and separately from storage tanks into a suitable reactor at such rates that the relative ratios by weight of the materials were 47 parts uninhibited vinylidene chloride, 53 parts acrylonitrile, 1 part ammonium persulfate, 0.832 part sodium metabisulfite, 2.5 parts emulsifying agent, and 596 parts water.

The resulting mixture was agitated vigorously while the temperature was maintained at 27° C., the contact time of the reactants being maintained at 6 hours. Polymerization ensued immediately and after 6 contact times, or 36 hours, a conversion of 87% of monomer to polymer was obtained (determined by titration of the residual acrylonitrile monomer).

The resulting copolymer was isolated in a normal manner and chemical analysis showed that it contained 34.89% chlorine which corresponds to 47.55% by weight of vinylidene chloride in the copolymer. It had an inherent viscosity in dimethyl formamide of 0.96.

*Examples 2 and 3*

These examples illustrate the use of vinylidene chloride stabilized in accordance with the invention in the process of above Example 1.

*Example 2.*—When the general procedure of Example 1 was repeated except that the vinylidene chloride was inhibited with 200 p.p.m. p-methoxyphenol, a conversion of 90.3% of monomer to polymer was obtained. The resulting copolymer was isolated in a normal manner and chemical analysis showed that it contained 34.7% chlorine which corresponds to 47.44% by weight of vinylidene chloride in the copolymer. It had an inherent viscosity in dimethyl formamide of 0.92.

*Example 3.*—When the general procedure for Example 1 was repeated except that the vinylidene chloride was inhibited with 500 p.p.m. p-methoxyphenol, a conversion of 87.4% of monomer to polymer was obtained. The resulting copolymer was isolated in a normal manner and chemical analysis showed that it contained 34.8% chloride which corresponds to 47.50% by weight of vinylidene chloride in the copolymer. It had an inherent viscosity in dimethyl formamide of 0.94.

Example 4

This example is for comparison purposes and illustrates the copolymerization of uninhibited vinyl chloride with acrylonitrile. An autoclave was charge with 70 parts uninhibited vinyl chloride, 30 parts acrylonitrile, 1 part ammonium persulfate, 0.832 part sodium metabisulfite, 2.5 parts sodium lauryl sulfate, and 594 parts distilled water. The resulting mixture was agitated vigorously and maintained at 40° C. for 8 hours at the end of which time 91.1 parts of vinyl chloride/acrylonitrile copolymer was obtained. This corresponds to a yield of 91.1%.

Example 5

This example illustrates the use of vinyl chloride stabilized in accordance with the invention in exactly the same process as above Example 4. An autoclave was charged with 70 parts vinyl chloride inhibited with 200 p.p.m. p-methoxyphenol, 30 parts acrylonitrile, 1 part ammonium persulfate, 0.832 part sodium metabisulfite, 25 parts sodium lauryl sulfate, and 594 parts distilled water. The resulting mixture was agitated vigorously and maintained at 40° C. for 8 hours at the end of which time 91.3 parts of a vinyl chloride/acrylonitrile copolymer was obtained. This corresponds to a yield of 91.3%.

While the invention has been illustrated in the above Examples 2, 3 and 5 with amounts of p-methoxy phenol of 200 p.p.m., 500 p.p.m. and 200 p.p.m, respectively, it will be understood that any amounts coming within the stated effective range of from 30–600 p.p.m. of p-methoxy phenol in vinyl chloride or vinylidene chloride will effectively stabilize these monomers. As indicated previously, the process of the invention not only stabilizes the monomer, but has the unexpected beneficial results of eliminating the monomer distillation step that is required to remove the undesirable conventional phenol stabilizer, the loss of monomer, the costly disposal of the phenol, and in certain instances, the addition of a second stabilizer subsequent to distillation. Also, the monomers stabilized in accordance with the invention can be used in the mentioned polymerizations directly without elimination of the p-methoxy phenol and with no particular surfactant or catalyst limitations, and the polymerization temperature is limited only by the boiling point of the monomer used. If high pressure equipment is used, higher polymerization can be employed. No other variables in the polymerization process are critical with the stabilized monomers of the invention. Accordingly, similar benefit would be expected in all the common polymerization reactions involving the stabilized monomers of the invention.

The invention has been described in detail with particular reference to preferred embodiments thereof, but it will be understood that variations and modifications can be effected within the spirit and scope of the invention as described hereinabove and as defined in the appended claims.

What we claim is:

1. As a composition of matter, polymerizable monomeric material comprising at least one halogen-containing monomer selected from the group consisting of vinyl chloride and vinylidene chloride, said monomeric material having dissolved therein from 30–600 parts per million of p-methoxy phenol, based on the content of said halogen-containing monomer.

2. As a composition of matter, vinylidene chloride having dissolved therein from 30–600 parts per million of p-methoxy phenol.

3. As a composition of matter, vinylidene chloride having dissolved therein from 50–500 parts per million of p-methoxy phenol.

4. As a composition of matter, vinyl chloride having dissolved therein from 30–600 parts per million of p-methoxy phenol.

5. As a composition of matter, vinyl chloride having dissolved therein from 50-500 parts per million of p-methoxy phenol.

References Cited in the file of this patent

UNITED STATES PATENTS 2,121,010   Britton et al. _____ June 21, 1938